INVENTOR
WILFRED F. STAFFORD

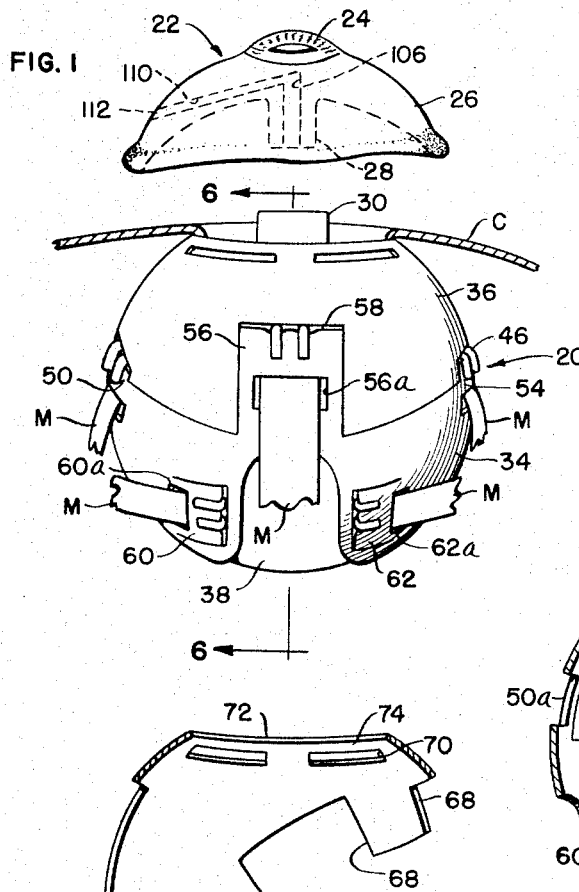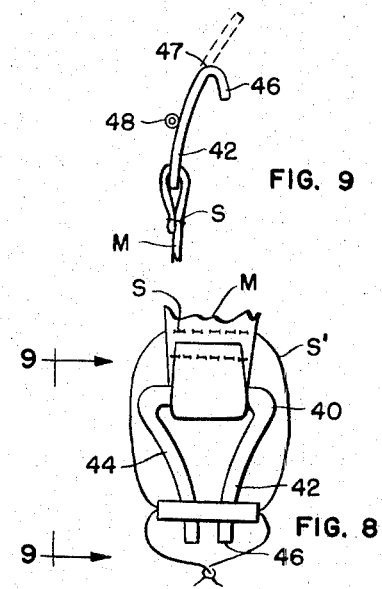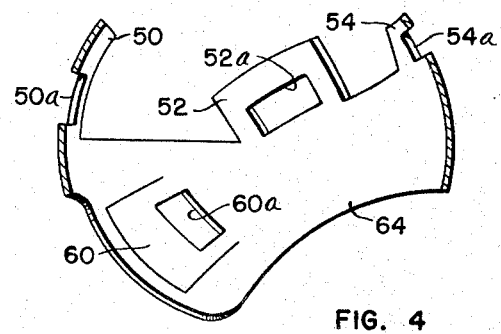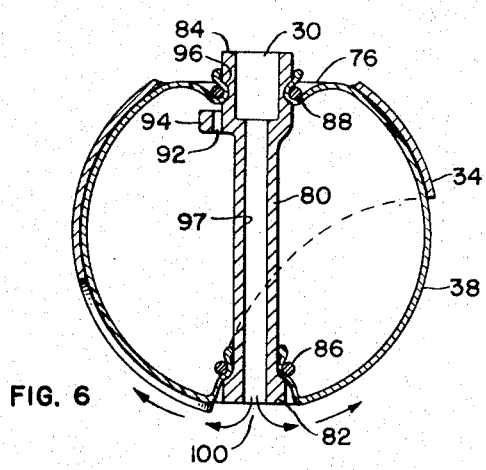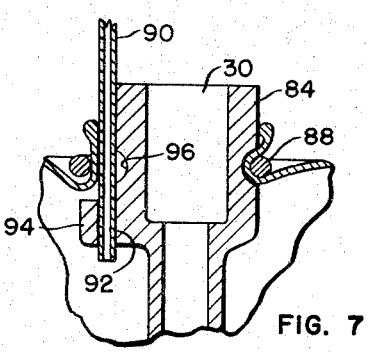

BY Brown Jackson
Boettcher & Dienner
ATTORNEYS

United States Patent Office 3,364,501
Patented Jan. 23, 1968

3,364,501
INFLATABLE TYPE EYE PROSTHESIS HAVING MEANS FOR ATTACHMENT TO THE EYE MUSCLES AND MEANS FOR CONDUCTING IRRIGATING FLUID THERETHROUGH
Wilfred F. Stafford, 7849 S. Shore Drive, Chicago, Ill. 60649; Wilma C. Stafford, administrator of the estate of Wilfred F. Stafford, deceased
Filed Jan. 12, 1965, Ser. No. 424,911
16 Claims. (Cl. 3—13)

This invention relates to eye prostheses or artificial eyes, so-called, and, although not limited thereto, is more particularly directed to constructions thereof which employ an implant separable from the eye shell or representation to which the eye muscles and conjunctiva are attached to impart motion to the eye prosthesis.

Broadly speaking, the invention contemplates a mechanical device or structure based upon the anatomy of the human eye but with intrinsic and integrated parts so arranged as to achieve physiological status at a low level of approximation to those inherent in a natural eye, and while giving prime consideration to the factors of internal tension and cellular transport in a prosthesis which lends itself to future work directed to optic nerve preservation, regeneration and repair. One of the major problems in using previously available prostheses has been that of satisfactorily securing the implant to the muscles and conjunctiva in order to achieve satisfactory motion. Another problem has been that of controlling the secretions which arise at the junction of the body tissue with the implant and create problems of infection and extrusion of the implant over varying periods of time.

Therefore a principal object and/or feature of the present invention is the provision of a conveniently cleanable intra-orbital ocular implant which may also be attached to all six muscles with a minimum amount of problems to the operating surgeon and will so locate the muscles that the response of the prosthesis thereto will realistically simulate the movements of the natural eye. In addition, the invention embodies a novel irrigating for the ocular implant which provides not only (1) A free draining attachment for the conjunctiva and tissues about the suspensory ligament of Lockwood, but also provides (2) Tension epithelization of the exposed orbital tissues;

(3) Positive pressure and regular fluid bathing of any retinal cells left in situ; and (4) Permits utilization of the lachrymal fluid with its bacteriostatic effect as a bathing or sterilizing agent for maintaining the vacated eye socket during the healing of the body tissues surrounding the inserted implant.

In the case of partially buried implants of the prior art where it has been desirable to maintain a union, although separable connection, between the eye representation or shell and the implant, secretions by the body tissue surrounding the implant in the eye socket has been a considerable problem even though meticulous precautions are observed during the operation to prevent infection. Extrusion of the implant is apparently the result of the body's attempt to provide a drainage system for these secretions. Another problem is the tendency of nature to build up a layer of protective cells between the newly inserted implant and surrounding tissues referred to as epithelization. During the initial period immediately following the operation while nature is attempting to cover the tissue defect by a layer of cells to protect the underlying tissues from injury and infection, the eye socket is akin to an open wound having communication with the outside atmosphere.

Therefore a feature and important object of the present invention is to provide a construction of eye prosthesis and implant which will accommodate a regular flushing of the surface behind the implant and the surrounding tissue of the eye socket to prevent the accumulation of secretions and possible sources of infection. By this means the tissue implant junction can be kept clean and it will remain indefinitely with a minimum of infection and extrusion problems.

In the accomplishment thereof I provide a novel construction of implant and eye representation whereby the natural lachrymal discharge of the tear ducts may be used as an aid in maintaining said posterior area sterile and in addition, I also provide means whereby an external supply of a bacteriostatic, antiseptic and tissue nutritive liquid or fluid such as quaternary ammonia compounds, for example, a water-diluted solution of benzalkonium chloride (1:2,000), may be directed as a fine stream under slight pressure through the implant to exit out its posterior side and flush said otherwise inaccessible side of the implant of accumulated secretions and also laving the conjunctiva as it works its way back and exits from the socket therebetween and the margin of the eye representation or eye shell to be caught in an appropriately provided catch basin or towel held against the face about or below the eye socket.

It is a particular feature of the invention that the means for conducting such regular irrigation can be patient controlled and therefore is uncomplicated in structure and simple and convenient to operate.

Still another feature and important object of the present invention is that it provides means and method of controlling the aforementioned epithelization process through the introduction of pressure in substitution for the pressure otherwise exerted by the natural eye, which cooperates with regular cleaning of the eye socket wall whereby the cellular growth over the surface of the defect or wounded area can proceed from the margin of the wound inwardly and form when healed a healthy lining composed of cells related to the nature of the cells at the margin.

Still another important object of the invention is to provide an implant member in plural sections. One of these sections comprises an annular shaped muscle attachment member having means spaced about its periphery which provide sliding attachment areas to which all six of the muscles, including the four recti and the two oblique muscles of the eye socket, may be attached conveniently and readily in substantially their natural positional relationships. The second of these sections comprises an anterior annulus also of a semi-spherical shape and which is adapted to be interlocked with the first annulus only after muscles have been attached to the first annulus. This second annulus comprises means to which the conjunctiva may be subsequently tied, stitched or otherwise connected. One advantage of such a plural part implant is the convenience and access it affords the surgeon in properly locating all six muscles for connection to the implant.

It is a further feature of the invention that I provide attachment stirrups in the form of hook members having a lateral bight portion over which the ends of the cut muscles are folded and stitched. I also provide these stirrups with transversely extending open ended tubes through which auxiliary wires may be threaded to hold the attached muscles taut to the stirrup during the time required for the stitched muscle end to heal about the bight of the stirrups. In accordance with the invention, the implant member also includes a further section in the form of an inflatable member which is inserted through an opening provided in the anterior side of the second annulus after the first and second annuli have been assembled in the eye socket with the eye muscles and conjunctiva attached thereto. This third section or inflatable member is then filled with a suitable fluid of high viscosity so that it functions to hold the two annuli comprising the implant as well as the muscles and conjunctiva attached thereto in place. Although, optionally, the eye muscles may be arranged about the exterior of the posterior or muscle attachment annulus and attached to the flaps thereof, preferably, I locate the muscles on the inner side of said annulus and attach them by said stirrups to the flaps thereof. This provides the physiological advantage of presenting a smooth surfaced implant to the socket and thereby promotes healing. In this event the third member when inflated directly cooperates with the posterior annulus to hold the stirrups and attached muscles in place. In addition, said third member when inflated also replaces the intraorbital tension lost by deflation of the eye socket upon enucleation of the natural eye ball.

It is also a feature of the invention that this inflatable third section of the implant further contains an axially extending rigid core extending therethrough, the anterior end of which is recessed to form a socket which receives a pin or other projection conventionally provided on the rear side of the eye representation or shell so that motion imparted to the implant by the conjunctiva and six muscles will be transmitted to the eye representation or shell. The rigidity of the core also aids in inserting the inflatable section through the anterior opening in the assembled annuli and also in properly locating it therein prior to inflation.

A further feature of the invention is that a passage is provided through said core which communicates at one end with said socket and opens at its other end through the posterior side of the implant. The eye shell is also appropriately cannulated so that fluid may be admitted through the anterior side of the eye shell into the recess or socket of the core and through the passage thereof for discharge behind the implant to accomplish the aforementioned flushing, cleaning and sterilizing of the posterior surface of the implant and the surrounding tissue of the eye socket.

A further feature of the invention is that the outer wall of the inflatable member is spirally channeled or grooved to effectively assist return of the discharged fluid for discharge from the eye socket about the eye shell or representation.

Other more specific features and advantages or objects of the invention include a novel throw-away container and manually operated pump for sterile flushing fluid which may be conveniently connected with the flushing system of the artificial eye and operated by the patient for daily evacuation or flushing of the posterior side and surrounding tissues of the eye socket.

Still other objects, advantages and features of the invention are the convenience of installation and construction provides. In addition, the invention represents an artificial eye structure which is also easy to clean and will be less subject to extrusion and problems of inflation.

Many other objects, features and advantages of the invention will be at once apparent or will suggest themselves after consideration of the detailed description of preferred embodiments of the invention which will now be described.

Referring therefore to the drawings:

FIGURE 1 is a side elevational view of an artificial eye formed according to the present invention showing the eye shell or representation detached from the implant portion and schematically illustrating the conjunctiva and eye muscles attached to the implant;

FIGURE 4 is a sectional view of the muscle attachment annulus;

FIGURE 5 is a sectional view of the conjunctiva attached annulus which is interlocked with the muscle attachment annulus as shown in FIGURE 1;

FIGURE 6 is a sectional view taken along lines 6—6 of FIGURE 1 looking in the direction indicated by the arrows to show details in construction of the fluid inflatable member or third section of the implant which is inserted within the hollow comprised by the assembly of the anterior and posterior annuli and inflated after assembly of the first two sections within the eye socket;

FIGURE 7 is an enlarged fragmentary view of the anterior end of the inflatable member and shows the filling needle assembled therewith;

FIGURE 8 is an enlarged fragmented view of one of the muscle attachment stirrups;

FIGURE 9 is a side elevational view taken of said stirrup looking along the line 9—9 of FIGURE 8 in the direction indicated by the arrows;

Figure 10:
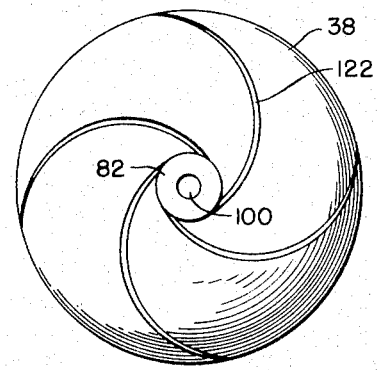
FIGURE 10 is a rear perspective view of the inflatable member or third section of the implant and illustrates the spiral channeling of the outer surface thereof.

Now referring more specifically to the several views comprising the drawings wherein like parts are identified by like reference numerals, FIGURE 1 illustrates one embodiment of the invention. The illustrated embodiment comprises an implant member indicated generally at 20 which is adapted to be inserted within the eye socket of the human body from which the natural eye has been enucleated by surgical means. As will be later described, implant member 20 is so constructed that the four rectus muscles and the two oblique muscles may be conveniently arranged therewithin and attached so as to operate in substantially their natural manner. At 22 is an eye representation or shell of known conventional type having a suitable iris simulation 24 of a color and pattern to match that of the good eye of the individual and which is embedded within a clear plastic outer covering shaped to simulate the cornea of the eye and having a surrounding scleral portion 26 formed of translucent plastic material of the shape and color pattern simulating that of the sclera of the individual's eye. In this instance the eye shell is provided with a centrally disposed projection 28 on its rear side which is of a noncircular shape and seats within a provided recess 30 (FIGURE 6) of the implant member 20 whereby eye shell 22 will move with the implant 20 in response to the muscular structure of the eye which is attached thereto. Conventionally, the eye representation 22 is so sized that when thus attached to the implant members, its peripheral edge is disposed hidden beneath the eyelids. As constructed, the eye shell 22 is therefore removable from the implant by withdrawing it from beneath the lids and unlodging the pin from its receiving recess. However, this is conventionally done only by the physician attending the patient and at infrequent intervals.

It is a feature of the present invention that the implant member 20 comprises three sections, a posterior or muscle attachment annulus 34, an anterior or conjunctiva attachment annulus 36, which are conveniently assembled within the eye socket by the surgeon as the operation proceeds, and an inflatable ball-shaped member 38, which is inserted within the hollow comprised by the assembly of annuli 34 and 36.

Figure 3:
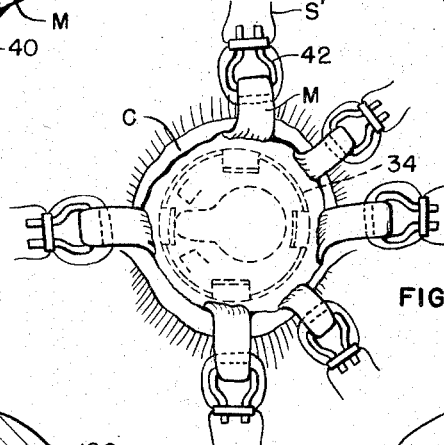
FIGURE 3 is a schematic plan view of an eye socket illustrating the eye muscles tied back after enucleation of the eyeball, the position of the muscle attachment annulus in the socket being shown by dotted lines.

The posterior annulus 34 (FIGURES 1, 3 and 4) is inserted within the eye socket after enucleation of the natural eyeball and serves as means to which the four rectus muscles and two oblique muscles are attached. FIGURE 3 illustrates an eye socket from which the eyeball has been enucleated and shows the muscles drawn back prior to their assembly with the muscle attachment annulus 34. In said view the top is considered to be the superior side of the socket and the bottom side the inferior, the right side being the nasal and the left side the temple side of the socket.

It is a feature of the invention that after incision of the conjunctiva and tenon's capsule, each muscle M is incised from the natural eyeball and its end folded about the laterally disposed bight portion 40 of an attachment stirrup indicated generally at 42 (FIGURES 8 and 9) and sutured with an absorbable thread S such as gut. Attachment stirrups 42 provide a convenient means for assembling each muscle with the implant and for this purpose are shaped to have a pair of legs 44 at either end of the muscle attachment bight 40 which converge to form a free end 46 which is folded back on itself to define a hook shape. Intermediate said bent end 46 and the attachment lateral bight 40 of the stirrup, I also secure a transversely extending open-ended hollow tube 48 through which the operating surgeon draws the ends of a second or auxiliary suture S' of stainless steel, vitallium or tantalum after catching the muscle therewith behind suture S and which he then ties so as to prevent separation of the muscle from its sutured connection above bight 40 during the interval (about 6 weeks) it requires for the muscle portions to grow together into an integral connection about bight 40. Optionally, thereafter metal suture S' may be removed if it is convenient to do so. After each of the six muscles has been detached from the eye and thus secured to its attachment stirrup, they are ready for attachment to posterior annulus 34. At a convenient moment in the operation, the posterior annulus or muscle attachment ring 34 is inserted into the void left by the vacated eyeball and the muscles attached thereto.

Considering next FIGURES 3 and 4 with FIGURE 1, the muscle attachment annulus 34 is seen to have an irregularly shaped large opening on its posterior side and that its anterior edge is so cut as to define circumferentially spaced flap-like portions 50, 52, 54 and 56. Said flap-like portions constitute sliding areas against which the four rectus muscles bear when their respective stirrups are attached to the ring as by hooking the bent end 46 of the stirrups over the free end or edge 58 of respective muscle bearing flaps 50-56. Muscle attachment annulus 34 may be constructed of any suitable plastic or metallic material inert, or as nearly so as possible, to the tissues and fluids of the body with which it will be associated when thus secured within the eye socket. Examples of suitable material include polytetrafluoroethylene, polyethylene, methylmethacrylate, nylon and metals such as gold, tantalum or niobium. Considered axially, the muscle attachment ring 34 is made as narrow as practical in order to leave as large size an opening 64 on its posterior side as is possible consistent with the necessary rigidity and shape retention required of the muscle attachment member 34 in order that it may serve its primary function to support the muscles.

In contrast with the usual construction of implant it is a feature of the present invention that the muscle attachment ring 34 also has provision for attachment of the inferior and superior oblique muscles in the form of oblique muscle attachment flaps 60 and 62. The oblique muscles are usually attached to the natural eye rearwardly or behind the attachment of the four rectus muscles which are usually in approximately the same plane, although behind the center of the eye. According to the present invention, the rectus attachment flaps 50–56 are so located that the mentioned bearing contact of the four rectus muscles with the implant will be behind the center of the implant 20. The oblique muscle attachment flaps 60 and 62 (FIGURE 1) are also provided toward the posterior side thereof but are angled somewhat to the plane containing the rectus attachment flaps 50–56.

Figure 2:
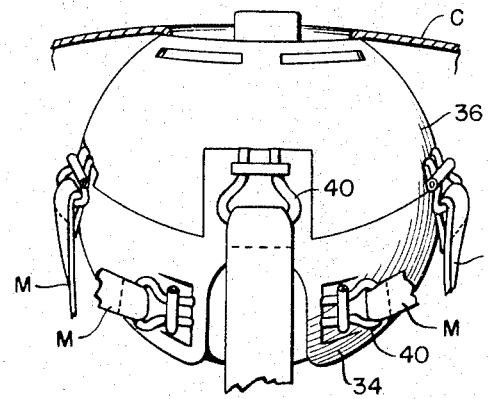
FIGURE 2 is a view generally similar to FIGURE 1 and illustrates the implant portion with the eye muscles arranged about its exterior and attached by stirrups to the flaps thereof.

The six flaps 50, 52, 54, 56, 60 and 62 correspond to the regions in the natural eye where the extrinsic eye muscles interdigitate with the sclera and in the preferred embodiment represented by FIGURE 1, each said flaps has an opening 50a, 52a, 54a, 56a, 60a and 62a through which the respective muscle M and/or stirrup 42 attached to the end thereof is drawn and so that the ends 50 of the stirrups 42 catch over the edge 58 of the respective flaps from the inside. It will also be understood that both in cutting the eye muscle tendon M from the natural sclera and in folding the cut end thereof over the bight 40 of the respective stirrup 42, the muscle is considerably shortened and wherefor in order to correctly place the locus of interdigitation with the flaps, the spacing of bend 47 from bight 40 may vary. Therefore, preferably the stirrups 42 are of a ductile metal and their legs 44 made sufficiently longer than necessary so that the bend 47 can be produced just prior to attachment of the stirrup end over the edge 58 of the respective flap, the excess length of the legs 44 being cut off. As previously mentioned, the openings 50a, 52a, 54a, 56a, 60a and 62a in the respective flaps are located proximal to the margin of the respective flaps and determine the locus of interdigitation; and also for mechanical extension of the muscle tendons M to provide convenience in attachment of the muscles from inside the annulus 34. Consequently, except for the small protrusion of the end 46 of the stirrups, annulus 34 presents an essentially smooth surface to the surrounding body tissues of the eye socket and is therefore more physiologically acceptable. Conceivably the muscles also may be arranged about the exterior of the annulus 34 and their stirrups hooked over the respective flap-like portions from the outside as is illustrated in FIGURE 2. However, this alternate arrangement is considerably less satisfactory because of the tendency of the muscles to pull the attachment flaps away from the spherical contour of the implant; increasing the surface irregularity as well as shortening the muscle origin and insertion distance with loss of muscle effectiveness. When attached in the preferred manner illustrated by FIGURE 1, the muscles tend to pull the muscle attachment flaps into the sphere but are opposed by the pressure of the inflated member 38 so that a smooth and more physiological acceptable surface is presented to the surrounding body tissues of the eye socket. Preferably, not only are the attachment stirrups 42 but also the rectus muscle flaps 50–56 and oblique muscle attachment flaps 60 and 62 are made slightly ductile or flexible in nature so that the surgeon may adjust the angle at which the flaps are set as well as change the length of the stirrup (i.e., the distance between bight 42 and bend 47) in order to obtain the best and most satisfactory assembly of the muscles about the muscle attachment annulus 34. Because muscle attachment annulus 34 is relatively narrow in its axial dimension and ring-like, the surgeon has access to the wounded portion of the eye socket after assembly of the muscles and also has freedom during the operation for motility of his instruments so that he may obtain a very natural arrangement of the six muscles in attaching them to the implant. The muscles can therefore be arranged to most satisfactorily cooperate to impart motion to the prosthesis closely simulating that of the natural eye.

After the surgeon has properly located the muscle attachment ring or annulus 34 in position within the eye socket, has properly adjusted its muscle attachment flaps and secured the six muscles thereto in their proper location by fitting the bent ends 46 thereof over the edges 58 of said flaps, the anterior annulus 36 may be then located in place. As illustrated in FIGURES 1 and 5, annulus 36 is also hollow and completes the ball-shape of the implant which corresponds roughly to the approximate size and shape of the natural eye that has been removed and which it is replacing. The posterior edge 66 of anterior annulus 36 is provided with cutouts 68 which correspond to the rectus muscle attachments 50–56 comprising the anterior edge of the posterior muscle attachment annulus 34. Consequently the two annuli have an interlocking fit with each other. It will be understood that the size of the muscle attachment flaps 50–56 and cutouts 68 on the posterior edge of the anterior annulus 36 need not exactly correspond in size and shape, and preferably the cutouts 68 will slightly exceed the dimensions of the corresponding muscle attachment flaps of the annulus 34 in order to provide clearance for the attachment stirrups 42 as well as ease and convenience in assembling the two annuli. The anterior annulus 36 serves as the attachment device for the conjuctiva and tenon's capsule and for this purpose is provided with a plurality of spaced slots 70 disposed parallel and adjacent the anterior edge 72 of the annulus. Portions 74 left therebetween in effect form a ring over which the conjunctiva and tenon's capsule may be drawn and secured either by a purse stitch, suture or any other convenient and conventional manner of connection.

The opening 76 defined by the circular shape of the anterior edge 72 of the anterior annulus 36 is made large enough to accommodate the convenient insertion of the inflatable member 38 which completes the assembly of the implant member 20.

Referring therefore now to FIGURES 6 and 7, with the muscle attachment annulus 34 and conjunctiva attachment annulus 36 assembled within the eye socket and properly attached to the six muscles and conjunctiva and tenon's capsule, the surgeon is ready to insert member 38 and inflate it so as to complete the locking of the two annuli and their attached muscles in place. This is obtained by inflating member 38 after its location within the assembled annuli so that its outer surface bears against the inner surface of the two annuli and the muscles including their attachment stirrups 42 and which helps to prevent their accidental dislodgement or disconnection. For this purpose member 38 is shaped to assume a generally ball shape when inflated and is of a suitable plastic material such as nylon or other of the aforementioned materials which is sufficiently flexible that it may be inserted while in a collapsed condition through the opening 76 in the anterior side of the assembled annuli 36 and 34 and afterwards expanded or inflated by filling with a suitable liquid. Extending axially through said member 38 is a core 80 shaped and dimensioned to have sufficient bulk as to be relatively rigid and shape retaining and may be molded from any of the materials mentioned above of which annuli 34 and 36 are constructed. Core 80 has enlarged opposed ends at 82 and 84, which protrude through provided openings in member 38 and about which the margins of the member are fluid-tight sealed. Enlarged end 84 contains the aforementioned recess 30 which receive the projection 28 of the eye shell 22 so that the motion of the motive structure attached to the two annuli 34 and 36 is imparted therethrough to member 38 when inflated and bearing against the inner walls thereof can be transmitted to the eye shell 22. Resilient clamp means are provided at 86 and 88 which resiliently clamp the opposed margins of the opposed openings in inflatable member 38 against enlarged ends 82 and 84 of the core. Preferably said enlarged ends are circumferentially shouldered or recessed to cooperate with said clamping means in obtaining the required fluid-tight seal.

Inflation of member 38 is conveniently accomplished by means of a hollow needle 90 (FIGURE 7) which is initially supported within a provided opening 92 in the peripherally extending ledge 94 of the attachment and 84 of the core 80. Although opening 92 and needle 90 are preferably tapered or otherwise shaped so that needle 90 cannot slip through opening 92 in ledge 94, the tension of the attachment clamp 88, particularly if it comprises a resilient band, may be sufficient to frictionally support the hollow needle 90. Once member 38 has been properly located within the hollow of the two annuli 34, 36, the adjustment of which is facilitated by the rigid character of core 80, member 38 is ready to be inflated and this is accomplished by admitting filling fluid through the hollow needle 90. Preferably the needle will be provided with two openings, the second allowing for the escape of air as fluid is admitted to the interior of member 38 through the first. Once member 38 has been inflated so as to fill the cavity comprising the hollow of the two annuli and to introduce the required amount of tension thereon, needle 90 may be withdrawn and the resiliency of clamping means 88 will draw the margin of member 38 into the recess 96 to assume the position illustrated in FIGURE 6 and whereby a fluid-tight seal is obtained. As previously mentioned, muscle attachment posterior annulus 34 has a relatively large opening in its posterior side. This allows member 38 when inflated to resiliently contact and thereby accommodates variations both in the inner surface of the two attachment annuli 34, 36 constituting the implant member, as well as any irregularities in the eye socket which result from the operation, and also to exert orbital pressure on the wounded part of the eye socket throughout a wide area thereof and which assists in the epithelization or healing process which takes place after the operation.

As previously pointed out, an important feature of the present invention is the novel irrigating system provided by means of which secretions accumulated by the wounded area in the rear of the eye socket may be regularly flushed in order to assure that infection will not set in and so that the wound can properly heal. In the illustrated embodiment of the invention, this means comprises a channel or passageway 97 which I extend through the core 80 so as to have an entrance into the recess 30 of its anterior end 84 and an exit 100 at its posterior end which is thereby located centrally of the posterior side of the implant and adjacent the wounded tissue when the implant is properly located within the eye socket.

In one form of the invention, I drill a hole 104 in the eye shell or representation 22 so that its extends obliquely forwardly from adjacent the internasal side or margin of the eye shell 22 (FIGURE 11) to the center thereof where it communicates with an axially extending tunnel 106 which I also drill in the stem or projection 28. The outer end 108 of hole 104 is preferably flared or enlarged so that when the eye representation is properly mounted within the eye socket, it lies adjacent to the caruncula lachrymalis so as to collect the lachrymal fluid or tears as they enter the conjunctival sac. The tears thus collected flow through passage or hole 104 and tunnel 106 into recess 30 and through passageway 97 in core 80 to the posterior side of the implant 20 whereby advantage may be had of their bacteriostatic character to sterilize and cleanse the wounded body tissues of the eye socket behind the implant, opening and closing of the eyelids acting like unto a pump which assists in enforcing movement of the lachrymal fluid through said passages. If necessary additional channels corresponding to passage 104 may be drilled so as to extend radially from central tunnel 106 to improve the collection of the tears discharged by the lachrymal glands.

Figure 15:
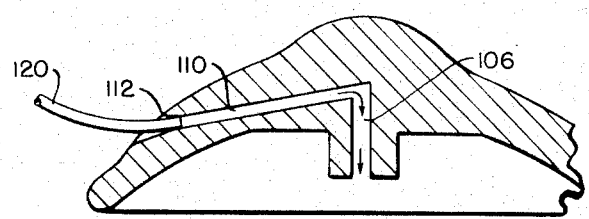
FIGURE 15 is a sectional view partially fragmented of an eyeshell and illustrates an alternate construction of the invention wherein the lachrymal fluid receiving channel has been omitted.
Figure 11:
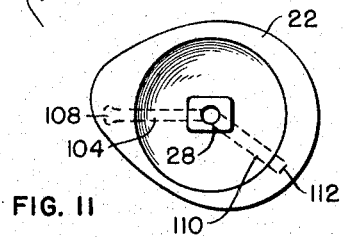
FIGURE 11 is a rear view of the eye shell or representation and illustrates in dotted lines the location of the lachrymal fluid receiving channel and the temporally directed auxiliary channel through which fluid is directed for flushing the posterior side of the implant member after assembled within the eye socket.

In a second form of the invention (FIGURE 15) I drill a channel 110 laterally of the eye shell representation which communicates at its inner end with the axially directed tunnel 106, but has an outer entrance 112 near the commissura lateralis optthalmicus or temporal side of the eye. Entrance 112 in this position is both inconspicuous and accessible for intubation. It is essential in this form of the invention that entrance 112 be conveniently accessible since its function is as a connector to a supply of the fluid which is used for periodic flushing of the posterior side of the implant and adjacent surrounding tissue of the eye socket. Preferably, the eye shell will be provided with both channels 104 and 110 in communication with tunnel 106 as is illustrated by FIG. 11. In this form, opening 108 to hole 104 can be covered with a finger of one hand and at the time of introduction of a fluid stream through 112 from a flushing fluid supply held and/or operated by the other hand so as to increase fluid pressure within passage 97.

Figure 12:
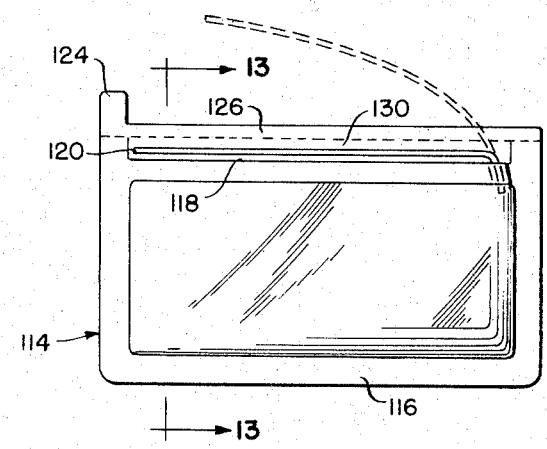
FIGURE 12 illustrates the throw-away container and pump for the sterile flushing fluid which is connected by the patient to the auxiliary channel in the eye shell or representation of the artificial eye prosthesis and operated to flush the eye socket tissues behind the implant.
Figure 13:
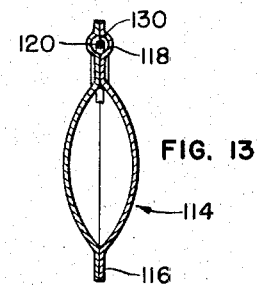
FIGURE 13 is a sectional view taken along lines 13—13 of said container as shown in FIGURE 12 looking in the direction indicated by the arrows.
Figure 14:
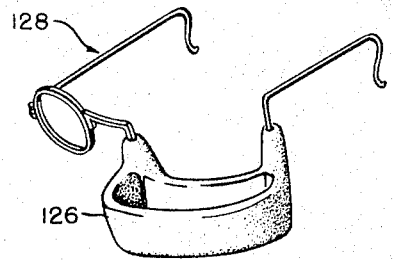
FIGURE 14 illustrates a spectacle type catch basin used with the invention for catching the flushing fluid which discharges from the eye socket to complete the treatment.

Referring therefore to FIGURES 12 and 13, although any convenient source of flushing fluid may be utilized, it is a feature of my invention that measured quantities of an appropriate fluid such as the aforementioned aqueous solution of benzalkonium chloride in suitable dilution can be packaged in containers to be used once and thrown away. Thus in FIGURES 12 and 13 a measured quantity of fluid sufficient to conduct one flushing of the eye socket behind the implant is stored within a container indicated generally at 114 and which comprises two sheets 116 of suitable flexible material such as polyethylene which are edge sealed along their four sides and including a piece of flexible tubing 118 having one end in communication with the interior thereof of the container. Tubing 118 is selected to have a cross section such that its free end 120 may be inserted into entrance 112 of the eye shell 22. Preferably the diameter of the bore through the tubing 118 is made small enough that the container fluid will not naturally flow therethrough except in response to a pumping action which is enforced by the patient pressing his fingers and squeezing together the opposite sides of the flexible walls 116 comprising the container. In this manner a fine stream of the fluid contents can be forced through the tube 118 into opening 110 to tunnel 106 and through passage 97 so as to exit centrally of the posterior side of the implant and wash the surrounding adjacent body tissue of accumulating secretions, the fluid flowing outwardly across the outer wall of member 38 and about annuli 34 and 36 to the anterior side of the implant member 20 where it exits through opening 76 within the secured margin of the conjunctiva and tenon's capsule and so as to discharge therebetween and the inner side of the eye shell 22 out the surrounding edges thereof. In the process the flushing fluids therefore also pass over and around the stitched connection of the six muscles to their respective attachment stirrups 42 so that the muscle wound is also bathed and flushed of accumulating secretions. Advantageously, the outer surface of member 38 is provided with forwardly directed spiralling channels 122 which assist in collecting the flushing fluid and directing it back toward the anterior opening 76. Although a towel held against the face beneath the eye socket can suffice to catch the discharging flushing fluid as it overflows the eye socket around the eye representation or shell 22, it is more convenient and satisfactory to the patient if some sort of receptacle is secured on the face as illustrated in FIGURE 14. In said FIGURE 14 such a receptacle is shown comprising a basin 126 having its inner surface conforming to the cheek of the face beneath the eye socket and supported in place on the patient's face by a conventional spectacle frame 128.

As thus described, it will be apparent that the entire flushing operation can be conveniently practiced by the patient without the presence of the doctor or surgeon and after a minimal amount of instruction. In the interest of keeping the entire operation sterile, tubing 118 may be enclosed within a recess 130 provided along the length of the fluid container 114 as shown in FIGURE 12, and so may be maintained sealed in a previously sterilized condition until needed. When the patient is ready to perform the eye flushing act he merely has to take one such packets 114 from a provided number thereof, cut or tear the packet along weakened or perforated line 126 by means of tab 124 to expose and permit access to the tube 118. Assuming that the patient has already donned the spectacle-supported basin of FIGURE 14, he is ready to start the eye flushing operation by inserting end 120 of tube 118 into the provided entrance 112 of his artificial eye representation. If necessary he may do this while looking in a mirror. To flush his eye socket, he need then while holding the packet 114 in his hand, squeeze its opposed sides forcing its fluid content through channel 110 of the eye shell into passageway 97 so as to discharge out the posterior side of the implant, to flush the rear side of the implant and the wounded tissues, the discharged or spent fluid overflowing from the eye socket and being caught in the basin 126 which may be emptied by a simple forward flexion of the head. The entire operation can therefore be performed by the patient using but one hand and with a minimum amount of difficulty or inconvenience to him.

It will thus be apparent that all of the recited objects, advantages and features of the invention have been demonstrated as obtained in a convenient and entirely practical manner and so that a patient is provided with an eye representtion or eye prosthesis which is not only natural in its appearance and motion, but is also comfortable to wear and which he may himself conveniently care for. It also provides an implant which is considerably less subject to extrusion and the problems of infection to which previous types of implants have been subject.

It will furthermore be understood that the aforedescribed embodiments are merely illustrative of the invention and that various modifications thereof, including substitution and rearrangement of parts, may be had within the spirit of the invention as is defined by the appended claims.

Having described my invention, I claim:

1. In an artificial eye, an implant member for insertion within an eye socket, and an eye representation on the anterior side of the implant member, said implant member and eye representation having a communicating passage provided with an entrance through the margin of the outer side of the eye representation and an exit through the posterior side of the implant member for the admission of fluid behind the implant member to flush the adjacent surrounding body tissue.

2. In an artificial eye, an implant member for insertion within an eye socket having means to which the eye muscles and conjunctiva of the socket are secured, and an eye representation on the anterior side of the implant member, said implant member and eye representation having a communicating passage with an entrance through the margin of the outer side of the eye representation and an exit through the posterior side of the implant member for the admission of fluid behind the implant member to flush the adjacent surrounding tissue of the eye socket.

3. An artificial eye comprising an implant member having an eye representation on its anterior side, means about its periphery to which the eye muscles may be attached when inserted in an eye socket and means extending through said eye representation and said implant member by which fluid may be introduced from its anterior side and directed therethrough for flushing the posterior side of the implant member.

4. In an artificial eye, the combination of an implant member including means for connection thereto of the motive structure of an individual's socket from which the natural eye has been removed, an eye shell having an eye respresentation including the sclera removably secured to the anterior side of said implant member, said implant member having a passageway therethrough with an entrance in its anterior side, an exit through its posterior side, said eye shell including a passage opening at one end through the sclera of the eye representation on the anterior side of the eye shell adjacent the margin thereof and communicating with said entrance to the passageway of the implant member when properly assembled therewith whereby sterile fluid may be conveniently directed behind the implant member when secured within the individual's eye socket so as to flush the adjacent surrounding tissues of the eye socket of secretions which otherwise naturally accumulate.

5. In an artificial eye, the combination of an implant member having means to which the muscles and conjunctiva of an individual's eye socket from which the natural eye has been removed may be attached, an eye shell removably secured to the anterior side of said implant member, means establishing a passageway through said implant member from an entrance in its anterior side to an exit in its posterior side, said eye shell including a passage opening at one end through the anterior side of the eye shell adjacent the margin thereof, and communicating with said entrance in the anterior side of the implant member when properly assembled therewith whereby sterile fluid may be conveniently directed behind the implant member when secured within the individual's eye socket so as to flush the adjacent surrounding tissues of the eye socket of secretions which otherwise naturally accumulate.

6. In an artificial eye, the combination of an implant member having a recess on its anterior side and means about its periphery for connection thereto of the muscles of an individual's socket from which the natural eye has been removed, an eye shell having an eye representation including the sclera adapted to be mounted over said implant member when thus secured within an eye socket, said eye shell having a projection on its rear side seating in said reccess in the anterior side of said implant member so as to move with movement of the implant member, said implant member having a passage opening at one end into said recess and at its other centrally of its posterior side, said eye shell including a further passage opening through the sclera of the eye representation on the anterior side of the eye shell adjacent the margin thereof and communicating through said projection into said recess whereby sterile fluid may be conveniently directed through the eye shell into said recess of the implant member and through the passageway thereof for discharge behind the implant member when secured within the individual's eye socket.

7. An artificial eye comprising a member insertable within an eye socket with its margin behind the eyelids to simulate a natural eye, said member including a passage opening at one end centrally of its posterior side and having an entrance in the margin of its anterior side located beneath the eyelids and adjacent the lachrymal gland when the member is within the eye socket so that lachrymal fluid discharging from said gland may be directed for flushing the posterior side of said member.

8. An artificial eye as claimed in claim 7 having a further opening on its anterior side communicating with said passage through which additional fluid from an external source may be directed through the member for flushing its posterior side.

9. In an implant for an artificial eye, the combination of a hollow ball-like member having means about its periphery to which the eye muscles and conjunctiva may be attached and an opening in its anterior side through which inflatable means is inserted and inflated, said inflatable means adapted to hold the attached eye muscles and conjunctiva and to fill the cavity vacated by removal of the natural eye from its socket.

10. In an artificial eye, an implant member comprising a first annulus of a size to fit within the eye socket of an individual from which the natural eye has been removed, said first annulus having spaced means about its periphery to which the eye muscles of said socket may be attached in substantially their natural attachment locations, a second annulus of semi-spherical shape interconnected with the first annulus on the anterior side thereof, said second annulus having means adjacent its anterior edge to which the conjunctiva may be attached, and an inflatable member inserted within the interior of said annuli, said inflatable member being adapted when inflated to fill the cavity vacated by removal of the natural eye from the individual's eye socket, and so as to hold the two annuli and the attached eye muscles and conjunctiva in place, said inflatable member including an anterior portion accessible through an opening in the anterior side of the second annulus with which an eye representation is removably interconnected so as to move with motion imparted to the implant member by the eye muscles attached to the first annulus.

11. An implant for an artificial eye comprising a hollow member of a size to fit within the eye socket of an individual from which the natural eye has been removed and having spaced means about its periphery to which the eye muscles of said socket may be attached in their natural attachment locations, and an inflatable member inserted within the interior of said hollow member once the muscles have been attached thereto and inflatable so as to fill the hollow of said member, said inflatable member including an anterior portion accessible through an opening in the anterior side of the hollow member with which an eye representation is adapted to be removably interconnected so as to move with motion imparted to the implant member by the eye muscles attached to the hollow member.

12. In an artificial eye, an implant member comprising a first annulus of a size to fit within the eye socket of an individual from which the natural eye has been removed, said first annulus having spaced means about its periphery to which the eye muscles of said socket may be attached in their natural attachment locations, a second annulus of semi-spherical shape interconnected with the first annulus on the anterior side thereof, said second annulus having means adjacent its anterior edge to which the conjunctiva may be attached, and an inflatable member inserted within the interior of said annuli, said member being inflated so as to fill the hollow comprising the two annuli so as to hold the two annuli and the attached eye muscles and conjunctiva in place, said inflatable member including an anterior portion accessible through an opening in the anterior side of the second annulus with which an eye representation is removably interconnected so as to move with motion imparted to the implant member by the eye muscles attached to the first annulus, said inflatable member further having passageway-defining means extending therethrough from an entrance in its said anterior portion to an exit on its posterior side through which sterile fluid may be directed behind the implant member when so assembled and secured within an individual's eye socket to flush the adjacent surrounding tissues of the eye socket.

13. In an artificial eye, an implant member as claimed in claim 12 wherein the inflatable member has channels spirally about its outer surface to promote flow of the flushing fluid about the surface thereof and back to the anterior side of the implant for drainage externally of the eye socket.

14. In an artificial eye implant, a first annular member of a size to fit within the eye socket of an individual from which the natural eye has been removed, said first member having its anterior peripheral edge comprising spaced protruding flap-like portions over which hook-like devices previously connected to the rectus muscles of said socket may be caught to arrange said muscles in their natural attachment locations and in sliding engagement with the surfaces thereof, and a second member of semispherical shape having its posterior edge provided with spaced cutouts which extend between the flap-like portions of said anterior edge of the first member after the muscles have been attached thereto so as to interlock therewith, said second member having means to which the conjunctiva may be subsequently attached.

15. In an artificial eye implant as claimed in claim 14 wherein the first annular member has circumferentially extending flap-like portions spaced posteriorly of its said anterior edge to which the oblique muscles may be attached and in sliding engagement with the surface thereof.

16. An attachment device for connection of an eye muscle to an implant to be secured within an eye socket so as to move in response to the action of said muscle, said device including a lateral bight over which the end of a muscle may be folded and stitched, said attachment device further including a pair of longitudinal extending legs at the ends of said lateral bight portion, the ends of said legs being disposed forwardly of said bight portion and bent to form a hook which will catch with a provided portion on the implant, and an open ended tube-like member secured transversely of said legs intermediate said bight portion and the bent ends of said legs.

References Cited

UNITED STATES PATENTS

| | | | |
|---|---|---|---|
| 709,392 | 9/1902 | Brown | 128—337 |
| 2,516,804 | 7/1950 | Rolf et al. | 3—13 |
| 2,649,590 | 8/1953 | Cutler | 3—13 |
| 2,856,932 | 10/1958 | Griffitts | 128—294 |
| 2,861,572 | 11/1958 | Hind et al. | 128—233 |
| 3,117,695 | 1/1964 | Cox | 222—107 XR |
| 3,144,976 | 8/1964 | Freshour | 229—7 |

OTHER REFERENCES

"The Plastic Eye Comes of Age" by J. S. Galeski, reprint from The Optical Journal and Review of Optometry, pp. 46–50, FIG. 2 on p. 48 relied upon, Apr. 1, 1949.

"A Basket Type Implant For Use After Enucleation" by N. L. Cutler, "Archives of Ophthalmology, vol. 35, No. 2, February 1946, pp. 71–83.

LAWRENCE W. TRAPP, *Primary Examiner.*

RICHARD A. GAUDET, *Examiner.*

R. L. FRINKS, *Assistant Examiner.*